United States Patent [19]
Watson

[11] Patent Number: 6,042,803
[45] Date of Patent: Mar. 28, 2000

[54] METHOD OF REACTING HYDROGEN SULFIDE TO PRODUCE SULFUR

[75] Inventor: Richard William Watson, Guildford, United Kingdom

[73] Assignee: The BOC Group plc, Surrey, United Kingdom

[21] Appl. No.: 09/185,761

[22] Filed: Nov. 4, 1998

Related U.S. Application Data

[62] Division of application No. 08/263,693, Jun. 22, 1994, abandoned.

[30] Foreign Application Priority Data

Jul. 9, 1993 [GB] United Kingdom .................... 9314212

[51] Int. Cl.⁷ ............................. C01B 17/04; B01D 53/52
[52] U.S. Cl. .................................. 423/574.1; 423/573.1; 431/9
[58] Field of Search ............................. 423/573.1, 574.1; 431/9

[56] References Cited

U.S. PATENT DOCUMENTS

| | | | |
|---|---|---|---|
| 3,860,697 | 1/1975 | Palm | 423/574 |
| 4,035,158 | 7/1977 | Scott et al. | 23/278 |
| 4,501,725 | 2/1985 | Lell | 423/573 R |
| 4,596,699 | 6/1986 | Desgrandchamps et al. | 422/160 |
| 4,643,888 | 2/1987 | Palm | 423/574 R |
| 5,139,764 | 8/1992 | Szekely | 423/574 R |
| 5,139,765 | 8/1992 | Szekely | 423/574 R |

FOREIGN PATENT DOCUMENTS

| | | | |
|---|---|---|---|
| 51-1360 | 1/1976 | Japan | 423/574.1 |

*Primary Examiner*—Steven P. Griffin
*Assistant Examiner*—Timothy C Vanoy
*Attorney, Agent, or Firm*—Salvatore P. Pace

[57] ABSTRACT

A method is provided for converting the hydrogen sulfide in a hydrogen sulfide containing feed gas into elemental sulfur by oxidizing the hydrogen sulfide with an oxygen containing gas to produce elemental sulfur in a Claus plant, wherein the oxygen containing gas is axially introduced into an end portion of the reaction cylinder of the Claus plant and the hydrogen sulfide containing gas is introduced through at least one gas inlet in the side wall of the reaction cylinder at an oblique or perpendicular angle with respect to the direction of the flow of the oxygen containing gas so that the hydrogen sulfide containing gas introduced through the side wall surrounds and swirls about the oxygen containing gas, thereby allowing higher combustion temperatures to be achieved within the reaction cylinder which enhances the efficiency of the combustion and enhances the efficiency of decomposing any ammonia in the gas while keeping the very hot zones away from the refractory material lining the interior of the reaction cylinder.

7 Claims, 2 Drawing Sheets

6,042,803

METHOD OF REACTING HYDROGEN SULFIDE TO PRODUCE SULFUR

RELATED APPLICATIONS

This is a Divisional of of U.S. patent application, Ser. No 08/263,693, filed Jun. 22, 1994 now abandoned claiming priority from Great Britain Patent Application Number GB 9314212.3 filed Jul. 9, 1993.

BACKGROUND OF THE INVENTION

The present invention relates to a method of reacting hydrogen sulfide with an oxygen containing gas for production of sulfur in a Claus sulfur plant More particularly, the present invention relates to such a method in which the hydrogen sulfide is swirled around the oxygen containing gas.

The Claus process is commonly used for recovering suilir from a feed gas stream rich in hydrogen sulfide. A typical Claus sulfur plant comprises a reaction furnace for partially combusting the feed gas stream with an oxygen containing or oxygen enriched gas, a first means of cooling and condensing sulfur from the combustion effluent, at least one train comprising a reheat means, a catalytic Claus reactor and an additional condensing means for further recovering sulfur from the effluent.

Presently known reactors comprise a cylindrical casing into which gas is introduced either axially or tangentially. Air, oxygen enriched air, or oxygen (hereinafter referred to as just oxygen) is introduced into the cylinder generally in the same direction as the gas flow in such a way as to cause mixing of said gas with the air etc. prior to combustion thereof When air and gas are introduced along the axis of the reactor inefficient mixing can result, which causes elements such as ammonia which may be present in the feed gas to be passed therethrough in an unreacted state.

If unreacted ammonia is passed to the downstream catalytic stages it can very rapidly form into ammonia salts such as ammonium sulfide, for example, which tends to block and hence reduce the efficiency of the catalytic stage.

In order to prevent the pass on of unreacted ammonia from the reactor to the catalytic stages it is necessary to ensure that the temperature of the combustion chamber is sufficiently great as to ensure the ammonia is fully destroyed. In order to ensure complete destruction it is necessary to operate with sufficient residence time and with the reactor temperature at least 1,200° C. and preferably between 1,500° C. and 1,650° C. This can be achieved by running the reactor on pure oxygen or oxygen enriched air for example or by splitting the gas flow into two portions and burning the first portion with all of the air required for the Claus reactor and then by introducing the second gas portion of the feed gas into the reactor at a position downstream of this initial combustion zone. This latter method is widely used when more than one feed gas stream is available and where at least one major feed stream contains no ammonia since the second portion of the gas stream must not contain ammonia.

It is an object of the present invention to provide a reactor suitable for use in the Claus process which reduces and possibly eliminates the carry over of unreacted ammonia to the downstream catalytic stages.

SUMMARY OF THE INTENTION

Accordingly, the present invention provides a method of reacting hydrogen sulfide with an oxygen containing gas for the recovery of sulfur. In accordance with the method, the hydrogen sulfide is burned in the presence of the oxygen containing gas within a reactor comprising a cylinder having a longitudinal axis X, a longitudinally extending wall section and an end portion. The hydrogen sulfide and the oxygen containing gas are mixed to form a mixture by introducing the oxygen containing gas into an oxygen inlet of the cylinder and the hydrogen sulfide into a gas inlet of the cylinder. The oxygen inlet of the cylinder is positioned for receiving and directing the oxygen containing gas axially, parallel to the longitudinal axis X, along the interior of the cylinder. The gas inlet is positioned for receiving and directing the hydrogen sulfide in a direction substantially across the cylinder thereby to cause the hydrogen sulfide to be entrained by the oxygen containing gas and swirled around the longitudinal axis X.

The hydrogen sulfide may be received within the cylinder and directed in a direction substantially across and down the cylinder.

The flow of the mixture may be disturbed by a baffle located within the cylinder, thereby to cause further mixing thereof.

Further amounts of the hydrogen sulfide may be introduced into said cylinder through a second gas inlet located downstream of the first gas inlet.

The hydrogen sulfide may be directed by the gas inlet in a direction substantially tangential to the cylindrical casing.

The oxygen containing gas may be introduced into the cylinder through a plurality of inlets thereof.

The flow of the oxygen containing gas may be controlled.

Air may be introduced into the burner in addition to the oxygen containing gas. The air injector may be an oxygen or a gas inlet.

BRIEF DESCRIPTION OF THE DRAWINGS

The present invention will now be more particularly described by way of example only with reference to the accompanying drawings, in which.

DETAILED DESCRIPTION

Gas streams comprising hydrogen sulfide are typically produced as waste products or by-products in many industrial processes. For example, acid gas streams comprising carbon dioxide and hydrogen sulfide are typically produced during oil refinery operations in which sulfur is removed from crude oil. It is necessary to treat such hydrogen sulfide containing streams before discharging them to the atmosphere so as to reduce or remove altogether their content of sulfur-containing gases. One well known, widely practiced process for the treating of gas stream comprising hydrogen sulfide is the Claus process. This process is based on the reaction between hydrogen sulfide and sulfur dioxide to form sulfur vapor and water vapor in accordance with the equation:

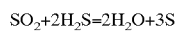

Sulfur exists in the vapor phase in a number of different molecular species such as $S_2$, $S_6$ and $S_8$ according to the temperature.

Figure 1:
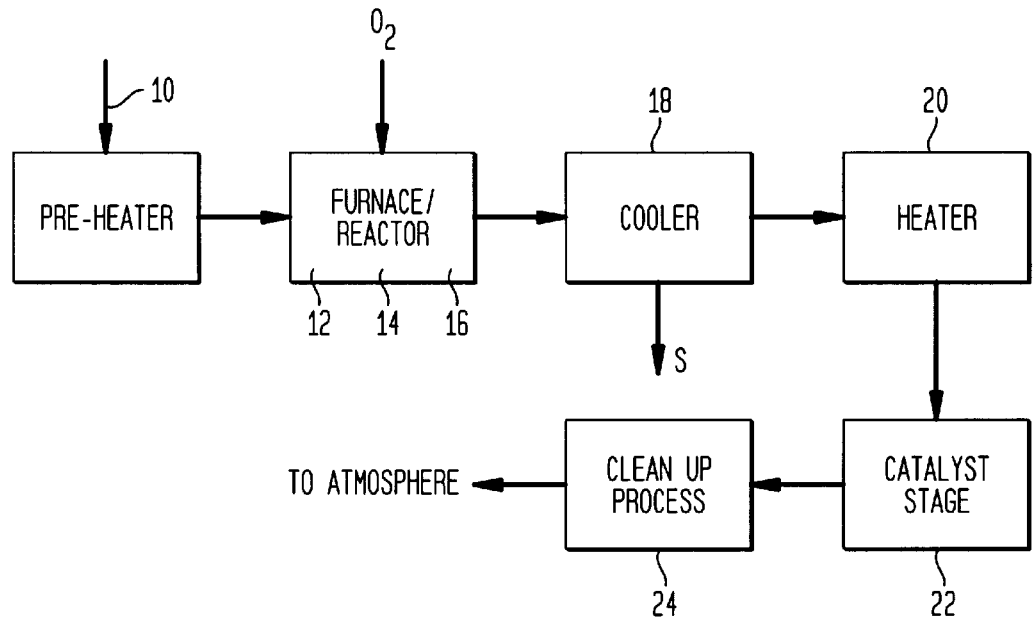
FIG. 1 is a diagrammatic representation of a Claus sulfur plant incorporating a burner according to the present invention.

The first stage of the Claus process is to burn approximately a third of the hydrogen sulfide in the incoming gas stream 10 in a burner 12 (FIG. 1 and FIG. 2) to form sulfur dioxide and water vapor in accordance with the equation:

$$2H_2S + 3O_2 = 2H_2O + 2SO_2$$

This combustion reaction takes place in a suitable furnace or reactor 14 and normally air is used as a source of oxygen for the purposes of combustion. Reaction between the sulfur dioxide and hydrogen sulfide starts in the combustion zone 16 and then continues downstream of the combustion zone 16. It is, however, a feature of the Claus reaction that at the temperature that is created by the combustion of hydrogen sulfide, it is not possible (with air) to convert more than about 75% of the remaining hydrogen sulfide to sulfur by reaction with sulfur dioxide, and typically between 50 to 70% of the hydrogen sulfide is so converted. It is, however, possible to achieve a higher total conversion in the presence of a catalyst at a reaction temperature in the order of 200 to 450° C. by reacting the remaining hydrogen sulfide and sulfur dioxide. Accordingly, after the gases pass out of the furnace they are cooled in a cooler 18 to a temperature at which the sulfur that is formed in the furnace condenses. The sulfur is thus recovered. The gases are then reheated in heater 20 to a temperature suitable for the performance of a catalyzed reaction in catalyst 22 between hydrogen sulfide and sulfur dioxide, such temperature typically being in the order of 200° C.

Typically, two or three stages of catalytic conversion are performed, with the hydrogen sulfide containing gas stream being reheated immediately upstream of each stage and resulting sulfur being separated from the gas stream by condensation immediately downstream of each stage. The resulting gas mixture now containing only a relatively low concentration of sulfur-containing gases is then typically passed to a tail gas clean-up process or is incinerated 24. Suitable tail gas clean-up processes include the Scot, Beavon and Stretford processes.

Figure 2:
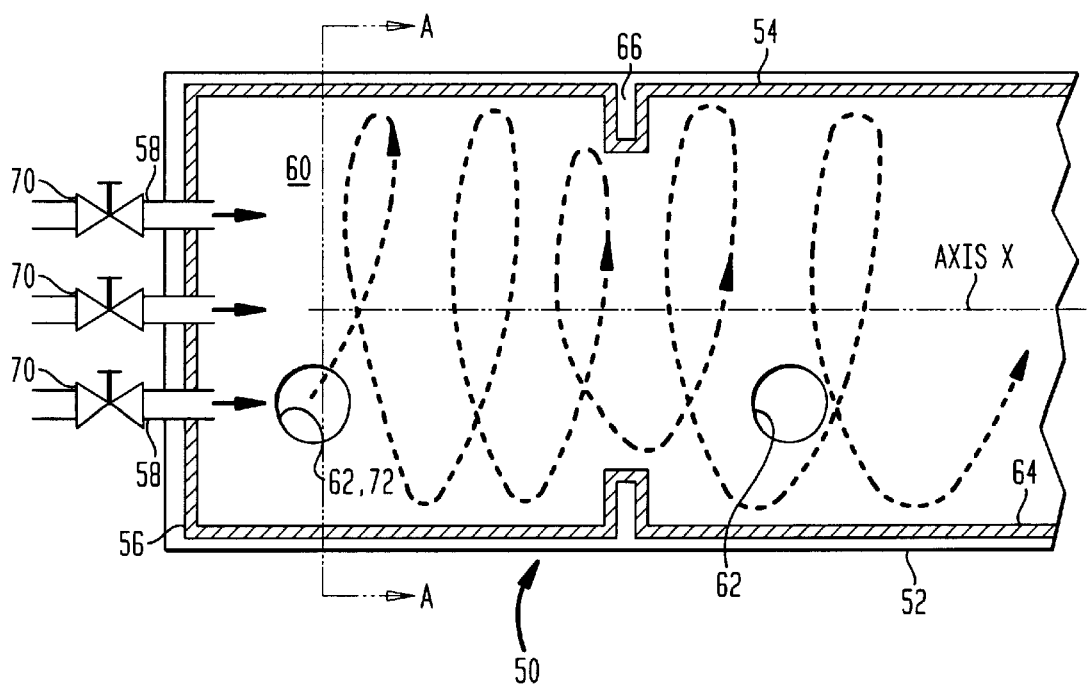
FIG. 2 is a cross-sectional view of the burner shown in FIG. 1.

The present invention, shown in detail in FIG. 2, provides a reactor or furnace 50 suitable for use as a combined mixing, burning and reaction stage in a Claus process. The reactor itself comprises a cylinder in the form of cylindrical casing 52 having a longitudinal axis X a longitudinally extending wall section 54 and an end portion 56. The burner further comprises an oxygen inlet or plurality of inlets 58 for receiving and directing air, oxygen enriched air or oxygen (for the purposes of brevity hereinafter referred to simply as oxygen) axially along the interior 60 of said reactor 50 and a gas inlet 62 or a plurality thereof for directing gas to be entrained by the oxygen and swirled around said longitudinal axis in the direction of axis X.

By introducing oxygen axially along the cylinder 52 rather than thereacross and the gas across the cylinder 52 rather than axially therealong, mixing and hence combustion is improved as the gas/oxygen mixture spirals around the longitudinal axis X. Improved mixing is, to some extent, attributed to the greatly increased gas molecule path length which aids a more complete destruction of materials such as ammonia An additional advantage of axial oxygen flow resides in the fact that very hot zones created around the oxygen inlet can be kept well away from any refractory material 64 used to line the interior surface of the cylinder. The hot zones will be directed largely down the axis of the furnace 50. Clearly, the higher the combustion temperatures that can be provided the greater the efficiency of oxidizing or decomposing components such as ammonia It has been found that mixing may be further enhanced by angling the gas inlet 62 such that it is positioned for receiving and directing gas in a direction substantially across and also axially down the cylinder 52. One or more baffles 66 may be provided within the reactor 50 and downstream of the gas inlet so as to cause further mixing of the gas/oxygen mixture.

If desired, several gas inlets 62 may be provided one or more of which may be positioned downstream of the baffle or baffles 66 if fitted.

Figure 4:
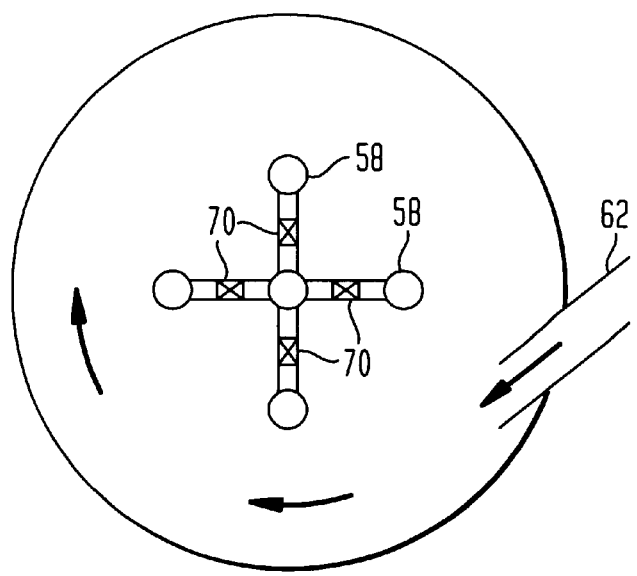

In one variation of the present invention the gas inlet or inlets 62 may be positioned for directing gas in a direction substantially tangential to the cylindrical casing 52 (as shown in FIG. 4) thereby to cause said gas to mix with said oxygen in a smoother manner.

Figure 3:
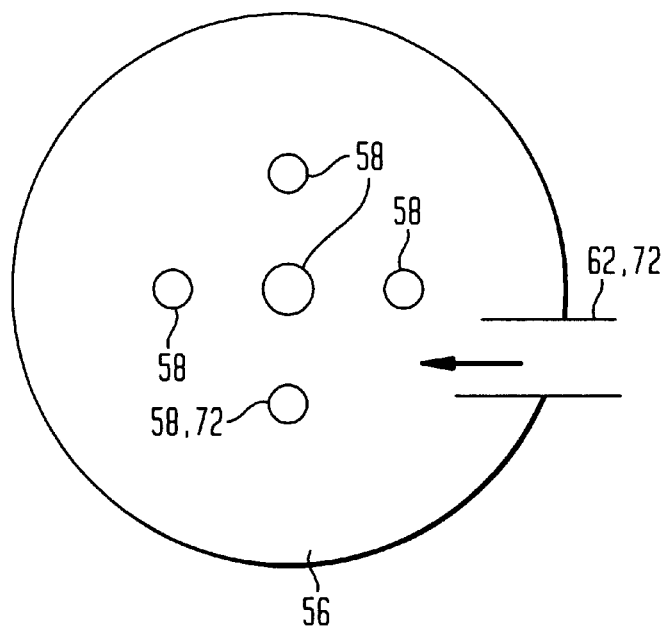
FIGS. 3 and 4 are alternative views of the oxygen inlets taken in the direction of arrows A—A in FIG. 2.

In order to facilitate the easy control of oxygen entering the reactor 50, the oxygen inlet may comprise a plurality of inlets and flow controlling means in the form of valve or valves 70 may be provided. Oxygen may be supplied via individual pipes to individual oxygen inlets 58 as shown in FIGS. 2 and 3 or it may be supplied via a control pipe and distributed to the individual inlets 58 as shown in FIG. 4. Alternatively, additional oxygen may be introduced by way of supplementary air injectors 72 which may comprise an oxygen inlet 58 or a gas inlet 62.

I claim:

1. A method of reacting hydrogen sulfide with an oxygen containing gas for the recovery of sulfur in a Claus plant, comprising:

injecting the oxygen containing gas into an end portion of a reaction cylinder in an axial direction so that the oxygen containing gas flows through a substantially central portion of the reaction cylinder;

injecting the hydrogen sulfide containing gas through a gas inlet in the side wall of the reaction cylinder at an oblique or perpendicular angle with respect to the flow of the oxygen containing gas so that the hydrogen sulfide containing gas injected through the side wall surrounds and swirls about the oxygen containing gas, and burning the hydrogen sulfide in the presence of the oxygen containing gas.

2. The method of claim 1, wherein said hydrogen sulfide containing gas is introduced into the reaction cylinder in a direction that is substantially across and down said reaction cylinder.

3. The method of claim 1, wherein the reaction cylinder contains baffles mounted within the interior wall in the reaction cylinder to promote mixing of the oxygen containing gas and the hydrogen sulfide containing gas.

4. The method of claim 1, wherein additional amounts of hydrogen sulfide are injected into the reaction cylinder via a second gas inlet located on the side wall of the reaction cylinder.

5. The method of claim 1, wherein the oxygen containing gas is introduced into the end portion of the reaction cylinder through a plurality of gas inlets.

6. The method of claim 1, wherein the flow of the oxygen containing gas is controlled.

7. The method of claim 1, wherein the oxygen containing gas is oxygen, oxygen enriched air or air.

* * * * *